(12) United States Patent
Rutz (10) Patent No.: US 9,445,663 B2
(45) Date of Patent: Sep. 20, 2016

(54) SLIDING-GUIDE ELEMENT AND TABLETOP-FASTENING SYSTEM FOR FASTENING A TABLETOP IN A DISPLACEABLE MANNER

(71) Applicant: Steelcase Inc., Grand Rapids, MI (US)

(72) Inventor: Josef Rutz, Rosenheim (DE)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/431,637

(22) PCT Filed: Sep. 18, 2013

(86) PCT No.: PCT/EP2013/002811
§ 371 (c)(1),
(2) Date: Mar. 26, 2015

(87) PCT Pub. No.: WO2014/072007
PCT Pub. Date: May 15, 2014

(65) Prior Publication Data
US 2015/0238008 A1 Aug. 27, 2015

(30) Foreign Application Priority Data
Nov. 8, 2012 (DE) .................. 10 2012 021 835

(51) Int. Cl.
*F16C 29/02* (2006.01)
*A47B 13/00* (2006.01)
*A47B 21/06* (2006.01)
*A47B 13/08* (2006.01)

(52) U.S. Cl.
CPC .......... *A47B 13/003* (2013.01); *A47B 13/081* (2013.01); *A47B 21/06* (2013.01); *F16C 29/02* (2013.01); *A47B 2021/062* (2013.01); *F16C 2226/74* (2013.01)

(58) Field of Classification Search
CPC ........ F16C 19/02; F16C 29/04; F16C 35/02; F16C 2226/74; F16C 2226/70; A47B 13/003; A47B 13/081; A47B 21/06; A47B 2021/062; A47B 9/00; A47B 17/03; B23Q 1/56; B23Q 1/26; B23Q 1/28
USPC ........... 384/26, 21, 36, 39, 41, 129; 108/26, 108/143, 159, 158.11
See application file for complete search history.

(56) References Cited

U.S. PATENT DOCUMENTS

| 4,109,588 A | * | 8/1978 | Powers | .................. | A47B 9/00 108/12 |
| 7,203,997 B2 | * | 4/2007 | Morgan | .................. | E05D 3/18 108/67 |

(Continued)

FOREIGN PATENT DOCUMENTS

| CH | EP 1391165 A1 * | 2/2004 | ............... A47B 1/05 |
| DE | 3915461 | 11/1989 | |

(Continued)

OTHER PUBLICATIONS

International Search Report, European Patent Office, Oct. 28, 2013.

*Primary Examiner* — Marcus Charles
(74) *Attorney, Agent, or Firm* — Price Heneveld LLP (57) ABSTRACT

A sliding guide element for moveable fastening a tabletop on bearing struts of a table frame comprises a main body configured to fasten to the underside of a tabletop, comprising a guiding portion configured to insert into a guide slot in bearing struts and moveable in the guide slot wherein the guide portion includes lateral guide surfaces for lateral guidance in the guide slot. The sliding guide element further includes resilient snap-fit limbs arranged on mutually opposed sides of the main body of the sliding guide element and moveable between an under-engagement position and project laterally over the guide portion to engage under a wall of the bearing struts, and an insertion position in which the snap-fit limbs guide through the guide slot in the bearing struts. The sliding guide elements still further includes a resiliently flexible end stop damper on at least one end region of the sliding-guide element.

15 Claims, 4 Drawing Sheets

(56) References Cited

U.S. PATENT DOCUMENTS

| | | | | |
|---|---|---|---|---|
| 2003/0056905 A1* | 3/2003 | Kuhn | ................ | B65H 35/0013 156/523 |
| 2005/0188806 A1* | 9/2005 | Garcia | ................ | B23D 45/067 83/471.3 |
| 2008/0023362 A1* | 1/2008 | Genosar | ............ | B65D 33/2591 206/459.1 |
| 2009/0220636 A1* | 9/2009 | Gunther | ................ | B29C 45/281 425/564 |
| 2011/0120352 A1* | 5/2011 | Marallo | ............... | A47B 13/081 108/25 |

FOREIGN PATENT DOCUMENTS

| | | | | |
|---|---|---|---|---|
| DE | 4033724 | | 4/1992 | |
| DE | 19508378 | | 4/1996 | |
| DE | 19500913 | | 7/1996 | |
| DE | 29614459 U1 | * | 11/1996 | ........... A47B 13/081 |
| DE | 29712252 | | 9/1997 | |
| DE | 19822700 | | 12/1998 | |
| DE | 29904237 | | 8/1999 | |
| DE | 10102402 | | 8/2002 | |
| DE | 202006016372 | | 12/2007 | |
| DE | 102009031939 | | 1/2011 | |
| EP | 0669092 | | 8/1995 | |
| EP | 0830825 | | 3/1998 | |
| EP | 1174056 | | 1/2002 | |
| EP | 1787548 | | 5/2007 | |
| GB | 1121532 A | * | 7/1968 | ........... A47B 13/081 |
| WO | WO 9965362 A1 | * | 12/1999 | ........... A47B 13/003 |
| WO | WO 2012086952 A2 | * | 2/2012 | ............. F16C 29/04 |

* cited by examiner

SLIDING-GUIDE ELEMENT AND TABLETOP-FASTENING SYSTEM FOR FASTENING A TABLETOP IN A DISPLACEABLE MANNER

CROSS-REFERENCE TO RELATED APPLICATIONS

This application is a filing under U.S.C. §371 of PCT Application No. PCT/EP2013/002811, filed Sep. 18, 2013, entitled "SLIDING GUIDE ELEMENT AND TABLETOP-FASTENING SYSTEM FOR FASTENING A TABLETOP IN A DISPLACEABLE MANNER," which claims the benefit of German Application No. 10 2012 021 835.4 filed on Nov. 8, 2012 and entitled "SLIDEWAY AND TABLETOP MOUNTING SYSTEM FOR SLIDABLY MOUNTING A TABLETOP," the entire disclosures of which are incorporated herein by reference.

BACKGROUND OF THE INVENTION

The invention relates to a sliding-guide element and to a table-top fastening system for fastening a table-top in a movable manner.

Specific types of tables, in particular office desks, are constructed such that the tabletop can be moved relative to the table frame in a horizontal direction and in particular away from and towards the user. This is the case in particular if there is arranged on the frame underneath the tabletop a cable duct, a cable box or the like which, during normal use of the table, is to be covered by the tabletop, but at the same time is also to be easy to access from above, for example for inserting cables, connecting plugs, etc.

As is known, a wide variety of carriage guide systems are used to movably fasten a tabletop to a table frame. However, these carriage guide systems suffer from the disadvantage that they have a relatively complex construction and they complicate the assembly of the tabletop on the table frame.

The object of the invention is that of providing a sliding-guide element and a tabletop-fastening system by means of which a tabletop can be movably fastened to a table frame in a manner which is as fast, simple and economical as possible and which allows the tabletop to be moved in a reliable, smooth and precise manner on the table frame.

SUMMARY OF THE INVENTION

The sliding-guide element according to the invention has a main body which can be fastened to the underside of the tabletop, comprising a guide portion which can be inserted into a guide slot in the bearing struts and can be moved within the guide slot and has lateral guide surfaces for lateral guidance in the guide slot. Furthermore, arranged on mutually opposed sides of the main body of the sliding-guide element are resilient snap-fit limbs which can be moved between an under-engagement position in which they project laterally over the guide portion in order to engage under a wall of the bearing struts, and an insertion position in which they can be guided through the guide slot in the bearing struts.

The tabletop can be fastened movably on the table frame very simply and quickly by means of the sliding-guide element. For this purpose, it is merely necessary, after the sliding-guide elements have been fastened to the underside of the tabletop, to position the tabletop on the table frame and, if necessary, to slightly press it on to guide the guide portion of the main body together with the snap-fit limbs through the guide slot in the bearing struts and just by doing this, to fasten the tabletop movably on the table frame. In so doing, the snap-fit limbs engage under the wall of the bearing struts so that it is no longer possible for the tabletop to be lifted off the frame without the snap-fit limbs being pressed back beforehand. Thus, the tabletop is assembled on the table frame by clipping the tabletop onto the bearing struts of the frame. The guide portion of the main body simultaneously guides the tabletop laterally on the bearing struts of the frame, so that separate devices are not required for this purpose.

According to an advantageous embodiment, the main body of the sliding-guide element comprises a support portion which can be positioned on a wall of the bearing struts and projects laterally over the guide portion. The tabletop is supported vertically by this support portion of the main body, preferably in addition to supporting cushions which are arranged on the bearing struts and on which the tabletop rests.

The snap-fit limbs of the sliding-guide element advantageously have a guide web which engages in the guide slot in the under-engagement position and thereby determines the lateral position of the snap-fit limbs relative to the main body. The guide web is thus a lateral positioning means for the snap-fit limb. When the tabletop is raised, the guide webs prevent the snap-fit limbs from being bent away laterally outwards.

The snap-fit limb advantageously extends obliquely upwards from a lower region of the main body. As a result, firstly, the resilient coupling of the snap-fit limb to the main body can be carried out in a simple manner and secondly, the snap-fit limb can be arranged obliquely or can be provided on the outside thereof with wedge-shaped webs in such a way that as the insertion portion is progressively introduced into the guide slot, the snap-fit limb is increasingly pressed towards the longitudinal centre plane of the sliding-guide element until it can spring back again laterally outwards under the wall and can engage under the wall.

The snap-fit limbs are advantageously arranged in the longitudinal direction of the sliding-guide element between a front fastening portion and a rear fastening portion of the sliding-guide element. As a result, the sliding-guide element can easily be designed to be symmetrical without the sliding-guide elements being distorted when lifting or lateral forces are applied.

The front and rear fastening portions of the sliding-guide element are advantageously interconnected by means of a connecting web which is not as wide as the fastening portions, as a result of which a clearance is formed for swiveling in the snap-fit arm.

According to an advantageous embodiment, the sliding-guide element has on at least one of its end regions a resiliently flexible end stop damper which comes into contact with the end of the guide slot or with a counterstop to delimit the movement path of the tabletop. An end stop damper of this type can prevent in a simple manner a hard stop of the tabletop at the end of the movement path. An end stop damper of this type can be produced very simply by a flexible end wall of the main body, which wall extends over an adjacent cavity in the main body.

The object mentioned at the outset is also achieved by a tabletop fastening system for movably fastening a tabletop to bearing struts of a table frame, comprising a plurality of sliding-guide elements of the type mentioned above, the bearing struts having on their upper side guide slots through which the guide portions of the sliding-guide elements can be guided with a small lateral clearance and through which the snap-fit limbs can be guided and, in their under-engagement position, the snap-fit limbs engaging behind a wall of the bearing struts such that the tabletop cannot be lifted off the table frame. A tabletop fastening system of this type has the same advantages as described in connection with the sliding-guide element.

BRIEF DESCRIPTION OF THE DRAWINGS

In the following, the invention will be described in greater detail by way of example, with reference to the drawings, in which.

DETAILED DESCRIPTION OF THE PREFERRED EMBODIMENTS

FIGS. 1 to 5 show a table 1 comprising a frame 2 and a tabletop 3 which is arranged movably on the frame 2. Tables of this type are used in particular in offices, but can also be used elsewhere.

The table frame 2 comprises two U-shaped side frame parts 4 which are formed in each case by two vertical table legs 5 and by a horizontal strut 6 which interconnects the two vertical table legs 5 at the upper ends thereof. Differently formed side frame parts, such as those which only have one central vertical support are also easily possible within the scope of the invention.

The two side frame parts 4 are rigidly interconnected by a longitudinal strut 7. In the embodiment shown, this longitudinal strut 7 consists of a hollow profile having a rectangular cross section. The longitudinal strut 7 is fastened to the two side frame parts 4 by means of two sleeve-like fastening consoles 8 which enclose the mutually opposed end regions of the longitudinal strut 7 and are fastened, more particularly tightly screwed, to the horizontal struts 6. For this purpose, the fastening consoles 8 have flanges 9 (FIG. 2) which can be positioned on the inner side faces of the horizontal struts 6 and can be tightly screwed to the horizontal struts 6. Furthermore, the longitudinal strut 7 runs at a specific, but small vertical distance under the tabletop 3.

The side frame parts 4 do not have to be interconnected by a single longitudinal strut 7. A plurality of longitudinal struts 7, more particularly two longitudinal struts 7 which are arranged parallel to and at a distance from one another, can also be provided.

Figures 1, 2:
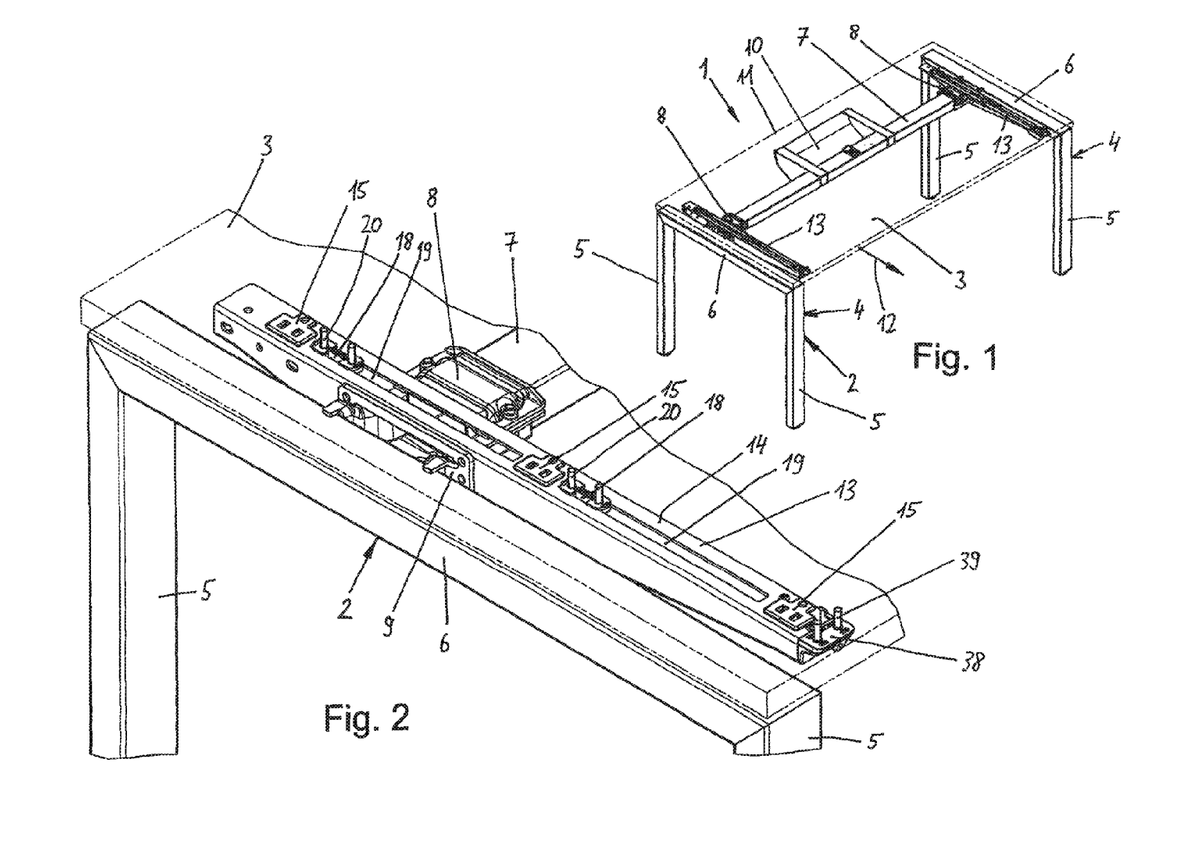
FIG. 1 is a three-dimensional view of a table in which sliding-guide elements according to the invention are used.
FIG. 2 is an enlarged view of a lateral end region of the table in FIG. 1.

As can be seen in FIG. 1, attached to the longitudinal strut 7 is a cage 10 which extends from the longitudinal strut 7 towards the peripheral region 11 of the tabletop 3 which is remote from the user. The cage 10 is used to hold cables, plugs and similar components. The cage 10 can also be a box for receiving electrical or electronic components which, in the case of vertically adjustable tables, are required for controlling the electric motors. As an alternative or in addition to the cage 10, other retaining elements, in particular in the form of holding hooks, holding clamps, cable ducts etc. can also be fastened to the longitudinal strut 7. It is also conceivable to provide an additional longitudinal strut 7 which runs relatively closely to the peripheral region 11 of the tabletop 3 and is at least partly open on the upper side thereof to form a cable duct or receiving duct, which can be accessed from above, for functional elements such as plugs etc.

To improve the accessibility of the cage 10 (or of other retaining elements or ducts which are not shown but have been described above) and in particular to allow access from above, the tabletop 3 is mounted in a movable manner on the table frame 3. Starting from the position shown in FIG. 1 in which the tabletop 3 covers the frame 3 and the cage 10, the tabletop 3 can be moved in the direction of arrow 12, i.e. in a horizontal plane transversely to the longitudinal strut 7 until the upper opening of the cage 10 is no longer covered by the tabletop 3, but can be accessed from above.

For the movable mounting of the tabletop 3, the table frame 2 comprises two bearing struts 13 in the form of support arms which are arranged adjacent to the horizontal struts 6 and run parallel thereto. These bearing struts 13 form a movable support for the tabletop 3, as will be described in greater detail in the following. In the embodiment shown, the bearing struts 13 are fastened to the fastening consoles 8, but they could also be fastened to the horizontal struts 6 or to the longitudinal strut 7. The length of the bearing struts 13 is calculated such that they extend at least over the main part of the width of the tabletop 3.

Figures 3, 4:
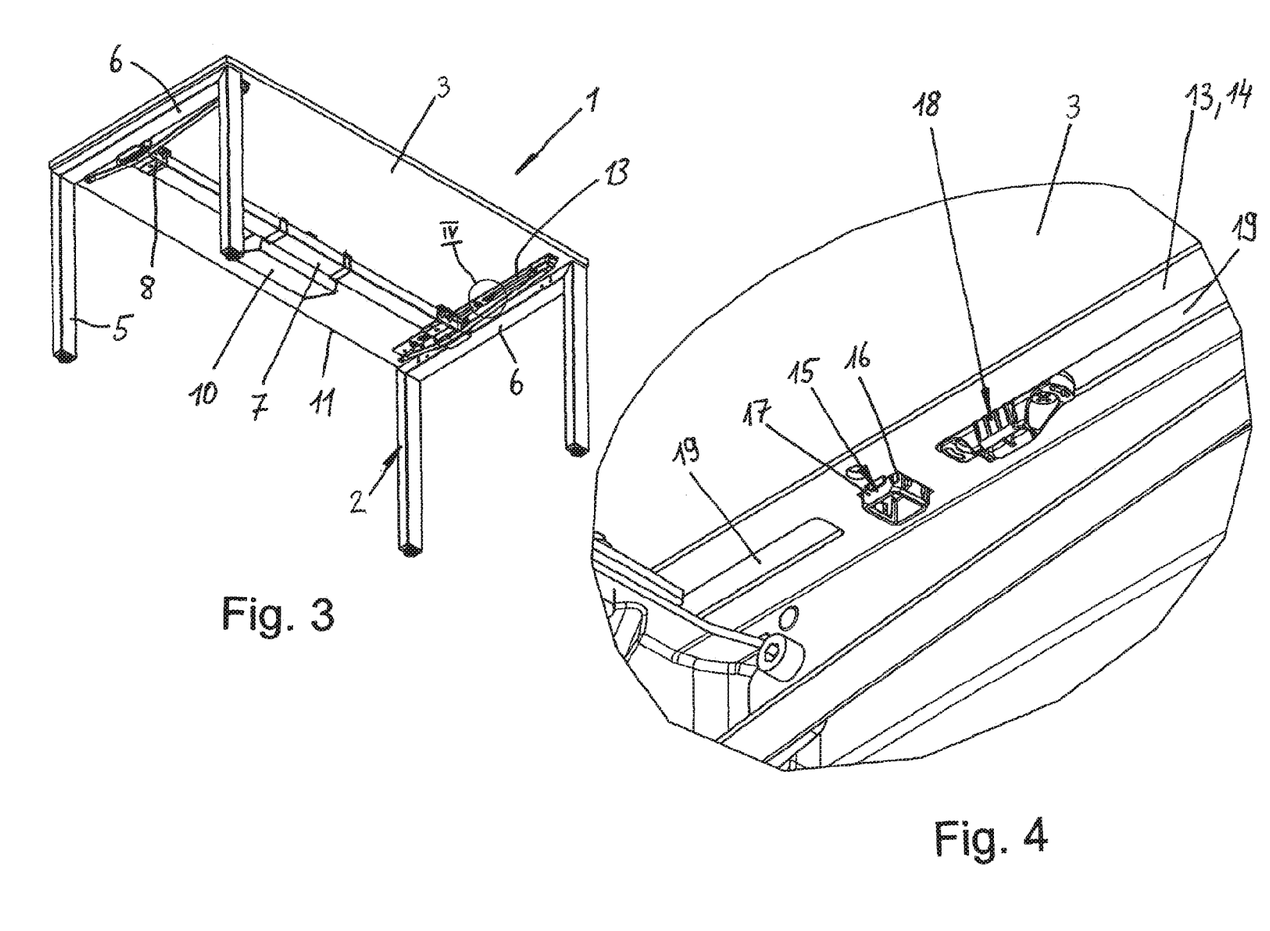
FIG. 3 shows the table in FIG. 1 obliquely from below.
FIG. 4 is an enlarged view of the detail IV from FIG. 3.

As can be seen in FIG. 2, fastened to the upper side of an upper wall 14 of the bearing struts 13 is a plurality of, in the present case three, small plate-shaped support cushions 15 on which the tabletop 3 is positioned. The support cushions 15 consist of a material on which the tabletop 3 can slide effectively, in particular plastics material. The support cushions 15 can be fastened in the wall 14, for example, in that, as can be seen in FIG. 4, the wall 14 has a recess 16 into which a downwardly projecting fastening portion 17 of the support cushions 15 can be clipped. The upper support surfaces of the support cushions 15 are located in a common plane which is slightly higher than the upper surface of the horizontal struts 6. Therefore, the tabletop 3, resting on the support cushions 15, is at a slight vertical distance from the horizontals struts 6 so that it does not rest thereon. The gap between the horizontals struts 6 and the underside of the tabletop 3 can optionally be closed, if desired, by means of a flexible sealing lip (not shown).

Figure 7:
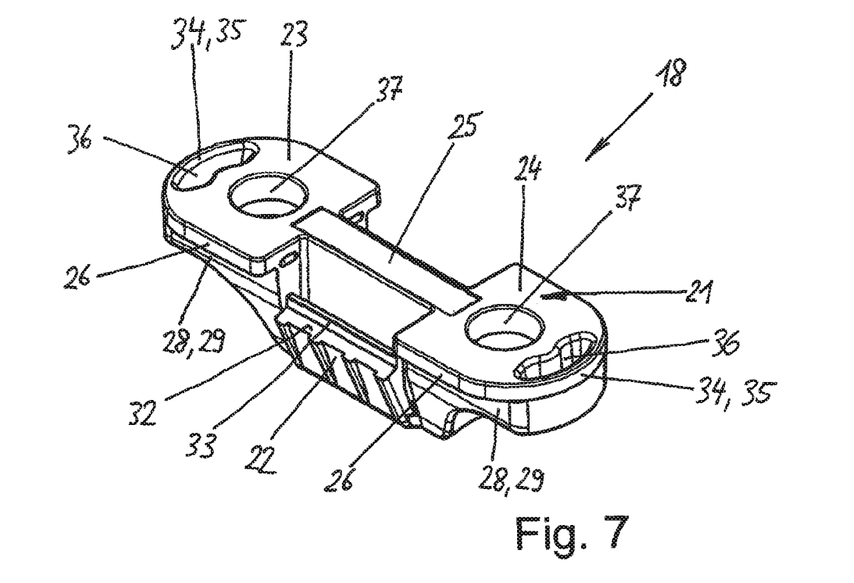
FIG. 7 is a three-dimensional view of the sliding-guide element according to the invention obliquely from above.
Figure 8:
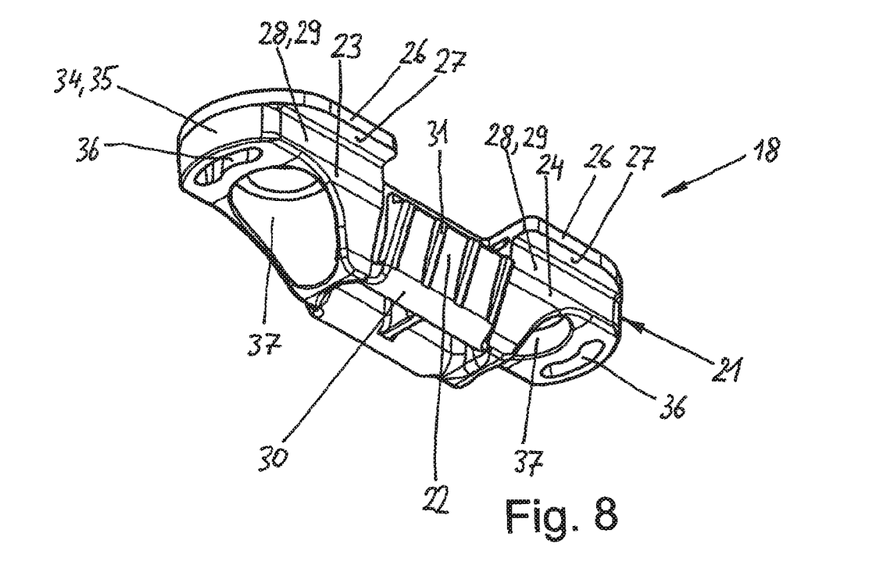
FIG. 8 is a three-dimensional view of the sliding-guide element in FIG. 7 obliquely from below.

The sliding-guidance of the tabletop 3 on the bearing struts 13 is performed by a plurality of sliding-guide elements 18 which are screwed tightly to the underside of the tabletop 3 and are guided in a longitudinally movable manner in guide slots 19 in the bearing struts 13. As can be seen in FIG. 2, each bearing strut 13 has two mutually aligned guide slots 19, one sliding-guide element 18 being introduced into each of these guide slots 19. All four of the sliding-guide elements 18 are identical. FIGS. 7 and 8 show one sliding-guide element on its own. In FIG. 2, reference numeral 20 denotes screws which are guided upwards from below through the sliding-guide elements 18 and by means of which the sliding-guide elements 18 are tightly screwed on the tabletop 3.

In the following, one of these sliding-guide elements 18 is described in greater detail with reference to FIGS. 7 and 8.

The sliding-guide element 18 is formed in one piece and consists of an elongate main body 21 and two snap-fit limbs 22 which are arranged on mutually opposed sides of the main body 21. The main body 21 comprises a front fastening portion 23, a rear fastening portion 24, which is at a distance therefrom in the longitudinal direction, and a connecting web 25 which interconnects the two fastening portions 23, 24. The two fastening portions 23, 24 each have a support portion 26 which is wider than the guide slot 19. The support portions 26 are thus designed such that they can rest with lower surfaces 27 on the upper side of the bearing struts 13 next to the guide slots 19 and they also serve as a support for the tabletop 3.

Guide portions 28 having a slightly smaller width join under the support portions 26. The guide portions 28 are delimited on both sides by mutually parallel lateral guide surfaces 29, the width of the guide portions 28 in the region of the lateral guide surfaces 29 being only slightly smaller than the width of the guide slots 19. When inserted, the lateral guide surfaces 29 are opposite the lateral boundary walls of the guide slot 19 and they allow a precise lateral guidance of the sliding-guide elements 18 in the guide slots 19.

The two snap-fit limbs 22 extend obliquely upwards and outwards from a lower region of the main body 21 which is located under the guide portions 28. The snap-fit limbs 22 are only joined to the connecting web 25 in the lower end region thereof by a resilient connecting wall 30, which is U-shaped in cross section, as a result of which the snap-fit limbs 22 are held flexibly on the main body 21 and can be swiveled transversely to the main body 21 and thus transversely to the longitudinal direction of the guide slots 19. To achieve the desired spring characteristic of the snap-fit limbs 22, it is also possible not to design the foot region of the snap-fit limbs 22 to be resilient, or to design not just the foot region, but to design the entirety of the snap-fit limbs 22 to be resilient.

In the lower region, the lateral outer faces of the two snap-fit limbs 22 are at a distance from one another which is slightly smaller than the width of the guide slots 19. However, in the upper region of the snap-fit limbs 22, the distance between the mutually opposed outer faces is greater than the width of the guide slots 19 so that the two snap-fit limbs 22 are pressed together, i.e. they are swiveled towards the central connecting web 25 when the sliding-guide elements 18 are inserted downwards from above into the guide slots 19. This pressed-together position of the snap-fit limbs 22 can also be called the insertion position. To allow the swiveling movement, which is associated therewith, of the snap-fit limbs 22, the width of the connecting web 25 is significantly less than that of the fastening portions 23, 24, i.e. it is also less than the width of the guide portions 28. Consequently, a clearance is created between connecting web 25 and snap-fit limbs 22 which allows the snap-fit limbs 22 to swivel inwards between the fastening portions 23, 24.

As can be seen in FIGS. 7 and 8, the snap-fit limbs 22 can have on their outside outwardly projecting ribs 31 which run obliquely upwards and act as run-up slopes when the snap-fit limbs 22 are guided through the guide slots 19, and at the same time constitute reinforcing elements in particular for the upper region of the snap-fit limbs 22.

When inserted, the snap-fit limbs 22 engage with the upper end face 32 thereof under the upper wall 14 of the bearing struts 13 in the peripheral regions next to the guide slots 19. This position of the snap-fit limbs 22 can also be referred to as the under-engagement position.

Extending upwards from the end face 32 is a guide web 33 which extends into the region of the guide slots 19 and is held on the side walls of the guide slots 19 by the outwardly acting spring force of the snap-fit limbs 22. These guide webs 33 thus determine the lateral position of the snap-fit limbs 22 relative to the main body 21 and prevent the snap-fit limbs 22 from being pushed away outwards when the tabletop 3 is raised.

As can also be seen in FIGS. 7 and 8, the sliding-guide elements 18 each have in the mutually opposed end regions a resiliently flexible end stop damper 34 which acts as a damper during movement of the tabletop when the end of the movement path has been reached. The end stop dampers 34 are formed by a resiliently flexible end region of the main body 21 itself, and in the embodiment shown are formed more specifically by a flexible end wall 35 which extends over an adjoining cavity 36 in the main body 21. As an alternative to a resiliently flexible end wall 35 of this type, the end stop damper 34 can also consist of separate, soft damping elements or separate spring elements which are arranged in the end regions of the main body 21. The end stop dampers 34 expediently cooperate with the ends of the guide slots 19, i.e. with the end face end walls of the guide slots 19. However, it is also possible to provide in the region of the guide slots 19 separate counterstops with which the end stop dampers 34 cooperate.

Figure 5:
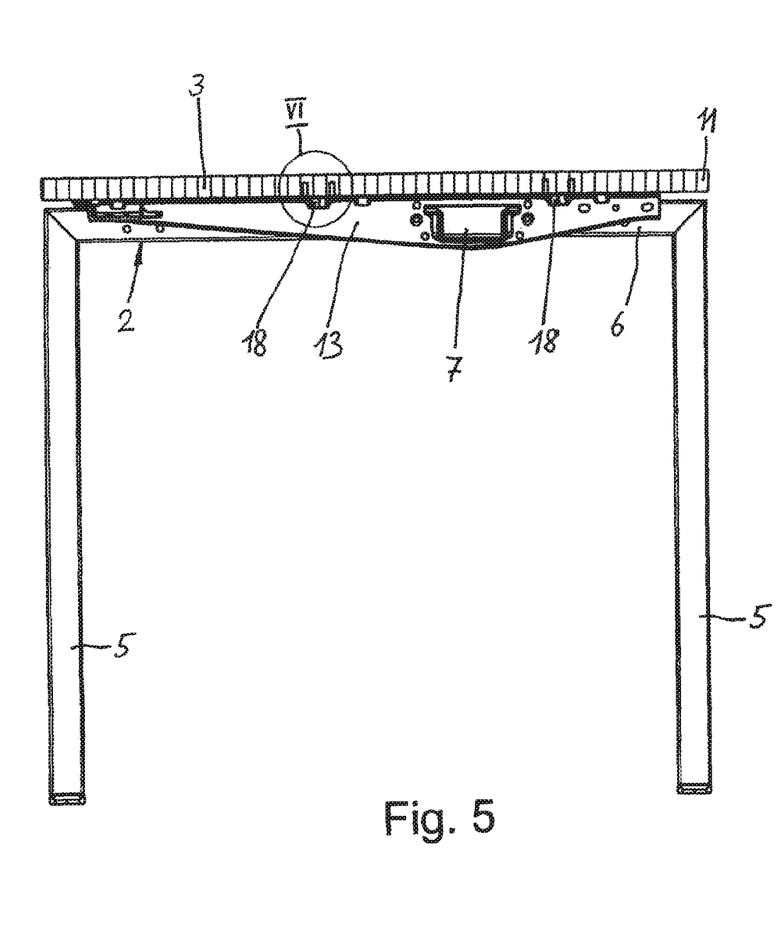
FIG. 5 is a vertical sectional view through the table in FIG. 1 in the region of the sliding-guide elements.
Figure 6:
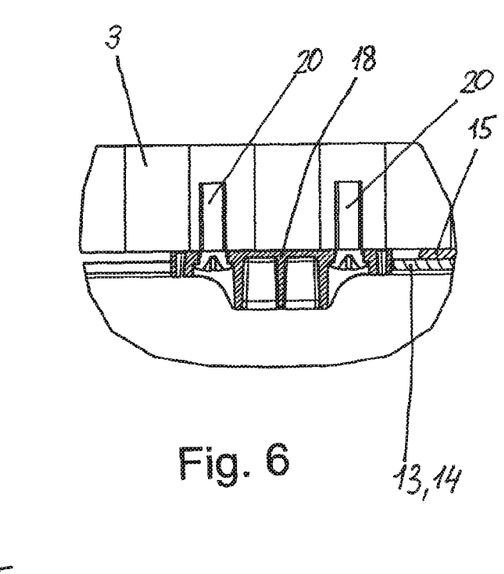
FIG. 6 is an enlarged view of the detail VI from FIG. 5.

The sliding-guide elements 18 are fastened to the underside of the tabletop 3 by means of two screws 20, as can be seen in FIGS. 5 and 6. These screws are guided upwards from below through screw holes 37 (FIG. 7, 8) in the fastening portions 23, 24.

Furthermore, as can be seen in FIG. 2, to lock the tabletop 3 in the position shown in FIG. 2, a locking element 38 is provided which can be tightly screwed to the underside of the tabletop 3 by means of screws 39. The locking element 38 comprises a hook, a swivel hook or a similar locking means which can be brought into or out of a locking engagement with a locking part in the end region of the bearing strut 13.

A large number of variations are possible within the scope of the invention. For example, instead of the support cushions 15 along which the tabletop 3 can slide, it is possible to provide rollers which form a roller bearing. It is also conceivable to dispense with the bearing struts 13 and to provide the guide slots 19 directly in the horizontal struts 6 of the table frame 2.

The invention claimed is:

1. A sliding-guide element for moveably fastening a tabletop on bearing struts of a table frame, comprising:
a main body configured to fasten to the underside of a tabletop, the main body comprising a guide portion configured to insert into a guide slot in bearing struts and moveable in the guide slot, wherein the guide portion includes lateral guide surfaces for lateral guidance in the guide slot; and
resilient snap-fit limbs arranged on mutually opposed sides of the main body of the sliding-guide element moveable between an under-engagement position in which the snap-fit limbs project laterally over the guide portion to engage under a wall of the bearing struts, and an insertion position in which the snap-fit limbs guide through the guide slot in the bearing struts;
wherein the sliding-guide element includes a resiliently flexible end stop damper on at least one end region of the sliding-guide element.

2. The sliding-guide element according to claim 1, wherein the main body of the sliding-guide element comprises a support portion positioned on the wall of the bearing struts and projecting laterally over the guide portion.

3. The sliding-guide element according to claim 2, wherein the snap-fit limbs of the sliding-guide element include a guide web that engages in the guide slot determines the lateral position of the snap-fit limbs relative to the main body when in the under-engagement position.

4. The sliding-guide element according to claim 3, wherein the snap-fit limbs extend obliquely upwards from a lower region of the main body.

5. The sliding-guide element according to claim 4, wherein the snap-fit limbs are arranged in the longitudinal direction of the sliding-guide element between a front fastening portion and a rear fastening portion (24) of the sliding-guide element.

6. The sliding-guide element according to claim 5, wherein the front and rear fastening portions of the sliding-guide element are interconnected by a connecting web that includes a smaller width than the fastening portions thereby allowing swiveling in the snap-fit limbs.

7. The sliding-guide element according to claim 6, wherein the end stop damper includes a resiliently flexible end region of the main body.

8. The sliding-guide element according to claim 7, wherein the resiliently flexible end region of the main body includes a flexible end wall of the main body that extends over an adjoining cavity in the main body.

9. The sliding-guide element according to claim 1, wherein the snap-fit limbs of the sliding-guide element include a guide web that engages in the guide slot determines the lateral position of the snap-fit limbs relative to the main body when in the under-engagement position.

10. The sliding-guide element according to claim 1, wherein the snap-fit limbs extend obliquely upwards from a lower region of the main body.

11. The sliding-guide element according to claim 1, wherein the snap-fit limbs are arranged in the longitudinal direction of the sliding-guide element between a front fastening portion and a rear fastening portion (24) of the sliding-guide element.

12. The sliding-guide element according to claim 11, wherein the front and rear fastening portions of the sliding-guide element are interconnected by a connecting web that includes a smaller width than the fastening portions thereby allowing swiveling in the snap-fit limbs.

13. The sliding-guide element according to claim 1, wherein the end stop damper includes a resiliently flexible end region of the main body.

14. The sliding-guide element according to claim 13, wherein the resiliently flexible end region of the main body includes a flexible end wall of the main body that extends over an adjoining cavity in the main body.

15. A tabletop fastening system for moveably fastening a tabletop on bearing struts of a table frame, comprising:
- a main body configured to fasten to the underside of a tabletop, the main body comprising a guide portion configured to insert into a guide slot in the bearing struts and moveable in the guide slot, wherein the guide portion includes lateral guide surfaces for lateral guidance in the guide slot; and
- resilient snap-fit limbs arranged on mutually opposed sides of the main body and that are moveable between an under-engagement position in which the snap-fit limbs project laterally over the guide portion to engage under a wall of the bearing struts, and an insertion position in which the snap-fit limbs guide through the guide slot in the bearing struts;
- wherein the sliding-guide element includes a resiliently flexible end stop damper on at least one end region of the sliding-guide element;
- wherein the bearing struts include on the upper side thereof the guide slots through which the guide portions of the sliding-guide elements are guided with a small lateral clearance and through which the snap-fit limbs are guided; and
- wherein snap-fit limbs engage behind the wall of the bearing struts when in the under-engagement position, such that the tabletop is prevented from lifting off the table frame.

* * * * *

UNITED STATES PATENT AND TRADEMARK OFFICE
CERTIFICATE OF CORRECTION

PATENT NO. : 9,445,663 B2
APPLICATION NO. : 14/431637
DATED : September 20, 2016
INVENTOR(S) : Rutz It is certified that error appears in the above-identified patent and that said Letters Patent is hereby corrected as shown below:

On the Title Page

Item (57), Abstract, Lines 1, 7, 9, 14:
"sliding guide" should be — sliding-guide —

Item (57), Abstract, Line 1:
"moveable" should be — movably —

Item (57), Abstract, Lines 5, 10:
"moveable" should be — movable —

Item (57), Abstract, Line 11:
"project" should be — projecting —

Item (57), Abstract, Line 14:
"elements" should be — element —

Item (57), Abstract, Line 14:
"includes" should be — include —

In the Specification

Column 1, Line 23:
"table-top fastening" should be — tabletop-fastening —

Column 1, Line 23:
"table-top" should be — tabletop —

Signed and Sealed this
Ninth Day of May, 2017

Michelle K. Lee
*Director of the United States Patent and Trademark Office*

CERTIFICATE OF CORRECTION (continued)
U.S. Pat. No. 9,445,663 B2

Column 2, Line 36:
"centre" should be — center —

Column 2, Line 62:
"tabletop fastening" should be — tabletop-fastening —

Column 3, Line 4:
"tabletop fastening" should be — tabletop-fastening —

Column 4, Lines 45, 46:
"horizontals" should be — horizontal —

Column 6, Line 27:
"FIG." should be — FIGS. —

In the Claims

Column 6, Claim 1, Line 46:
"moveably" should be — movably —

Column 6, Claim 1, Lines 51, 56:
"moveable" should be — movable —

Column 6, Claim 1, Line 53:
Delete "and"

Column 6, Claim 1, Line 60:
After "struts;" insert -- and --

Column 7, Claim 3, Line 3:
After "slot" insert -- and --

Column 7, Claim 5, Line 12:
Delete "(24)"

Column 7, Claim 9, Line 28:
After "slot" insert -- and --

Column 7, Claim 11, Line 37:
Delete "(24)"

Column 8, Claim 15, Line 11:
"tabletop fastening" should be — tabletop-fastening —

CERTIFICATE OF CORRECTION (continued)
U.S. Pat. No. 9,445,663 B2

Column 8, Claim 15, Line 11:
"moveably" should be — movably —

Column 8, Claim 15, Lines 16, 20:
"moveable" should be — movable —